(12) United States Patent
Wang et al.

(10) Patent No.: US 10,572,621 B1
(45) Date of Patent: Feb. 25, 2020

(54) PHYSICAL SYNTHESIS WITHIN PLACEMENT

(71) Applicant: Xilinx, Inc., San Jose, CA (US)

(72) Inventors: Zhiyong Wang, Cupertino, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/034,242

(22) Filed: Jul. 12, 2018

(51) Int. Cl.
*G06F 17/50* (2006.01)

(52) U.S. Cl.
CPC ........ *G06F 17/5072* (2013.01); *G06F 17/505* (2013.01); *G06F 17/5081* (2013.01); *G06F 2217/84* (2013.01)

(58) Field of Classification Search
CPC ............... G06F 17/505; G06F 2217/84; G06F 17/5031; G06F 17/5068; G06F 17/5045; G06F 17/5072; G06F 2217/78; G06F 17/5081; G06F 17/5054; G06F 2217/14; G06F 17/5027; G06F 17/504; G06F 17/5022; G06F 17/5059; G06F 17/5077; G06F 2217/06; G06F 2217/08; G06F 11/073; G06F 11/0751; G06F 11/0781; G06F 11/079; G06F 17/5009; G06F 1/08; G06F 1/10; G06F 2217/04; G06F 2217/62; G06F 2217/80; G06F 8/71; H03K 19/17744; H01L 27/118
USPC .................................................. 716/118–125
See application file for complete search history.

(56) References Cited

U.S. PATENT DOCUMENTS

| | | | |
|---|---|---|---|
| 2001/0010090 A1* | 7/2001 | Boyle | G06F 17/505 716/105 |
| 2005/0268258 A1* | 12/2005 | Decker | G06F 17/5022 716/104 |
| 2007/0234266 A1* | 10/2007 | Chen | G06F 17/5054 716/113 |

* cited by examiner

*Primary Examiner* — Binh C Tat
(74) *Attorney, Agent, or Firm* — Michael P. Shepherd

(57) ABSTRACT

Methods, systems, and apparatus, including computer programs encoded on computer storage media, for performing physical synthesis with an overall placement process. One of the methods includes receiving an initial netlist of a circuit design for an IC. A global placement process is performed that assigns to some components in the initial netlist a respective initial location on the IC. One or more physical synthesis processes are performed to generate a modified netlist before assigning a final location to all components in the circuit design by an overall placement process. A subsequent placement process is performed to assign a final location on the IC to all components in the modified netlist.

20 Claims, 13 Drawing Sheets

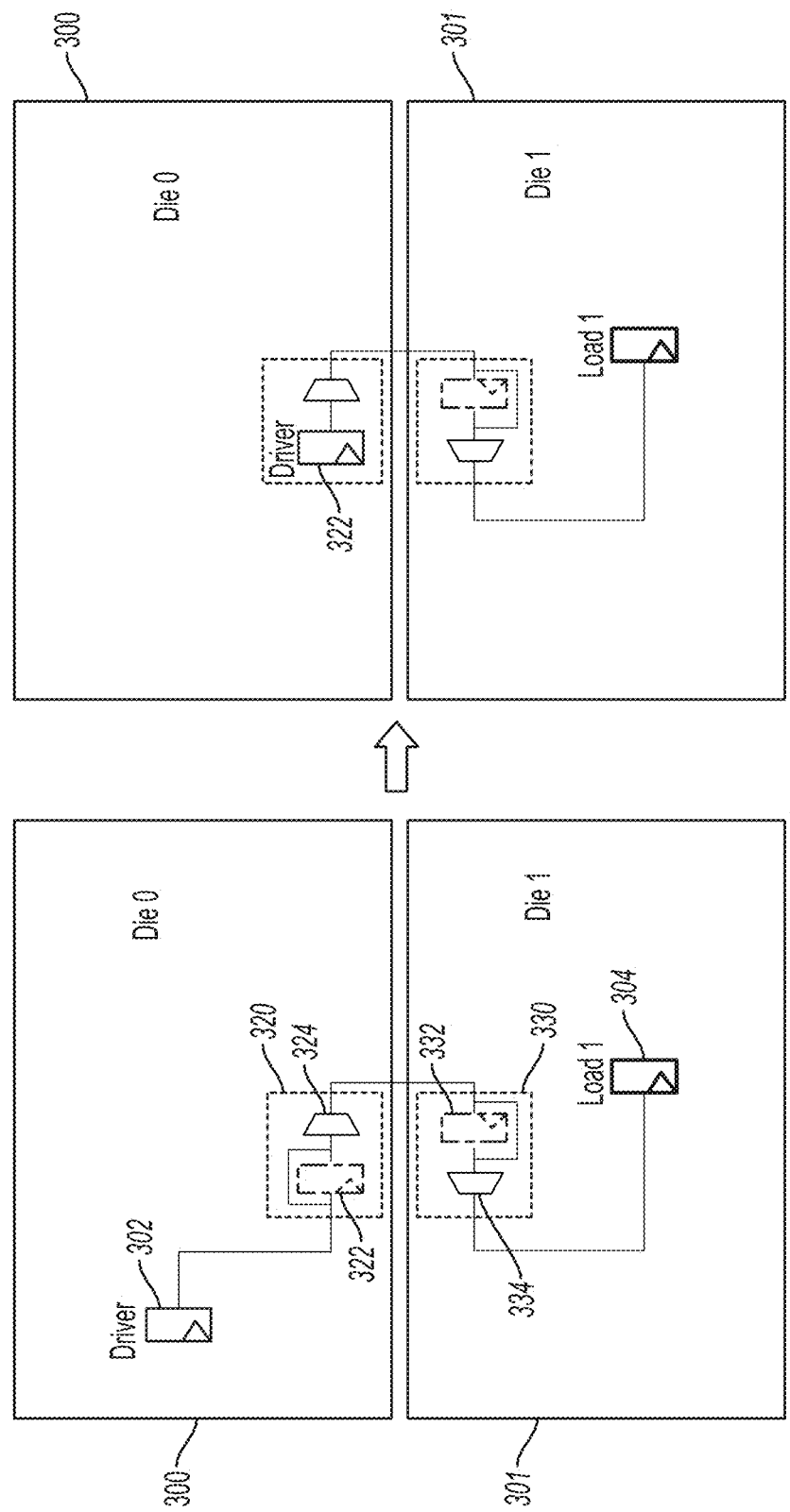

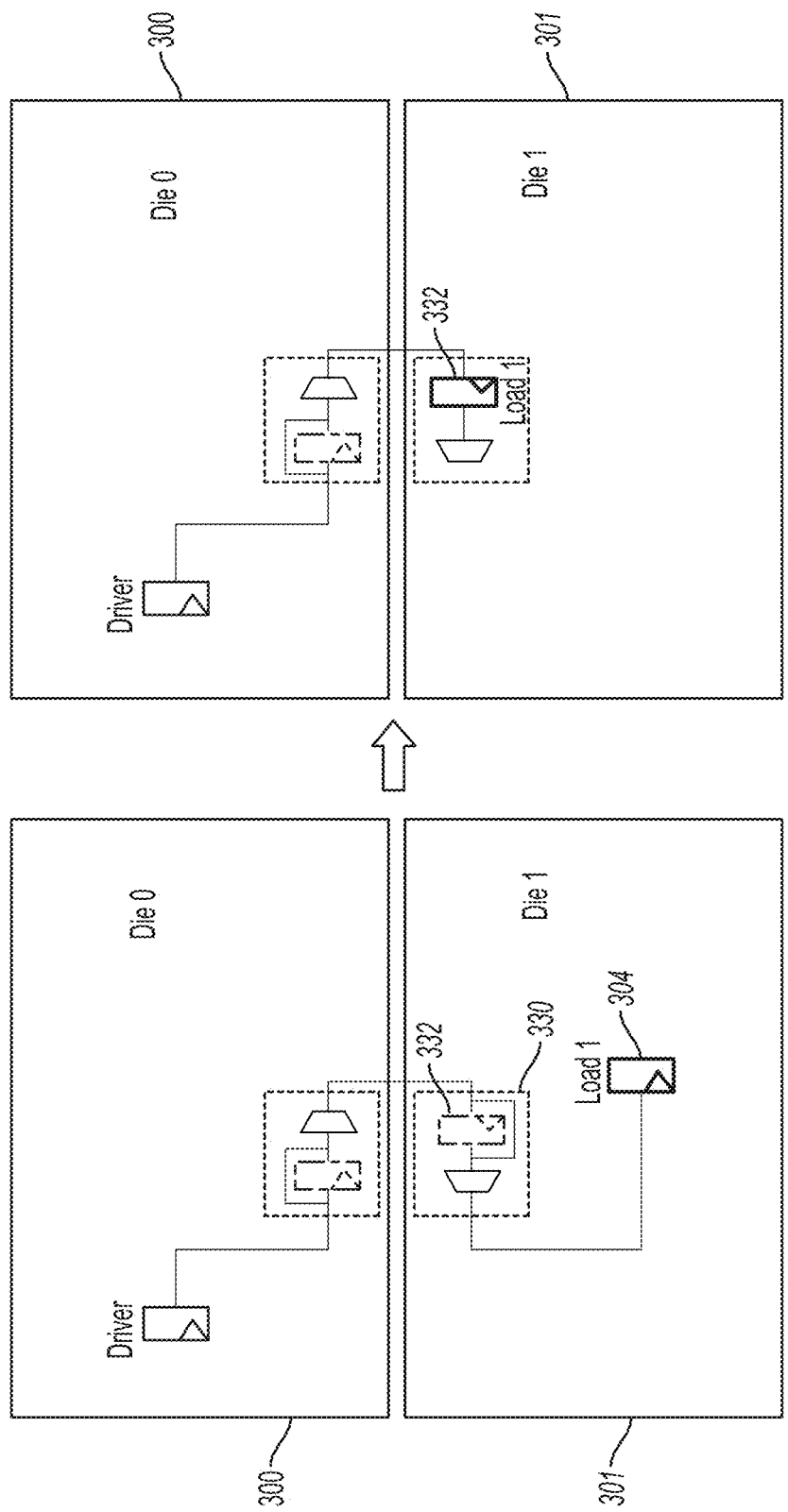

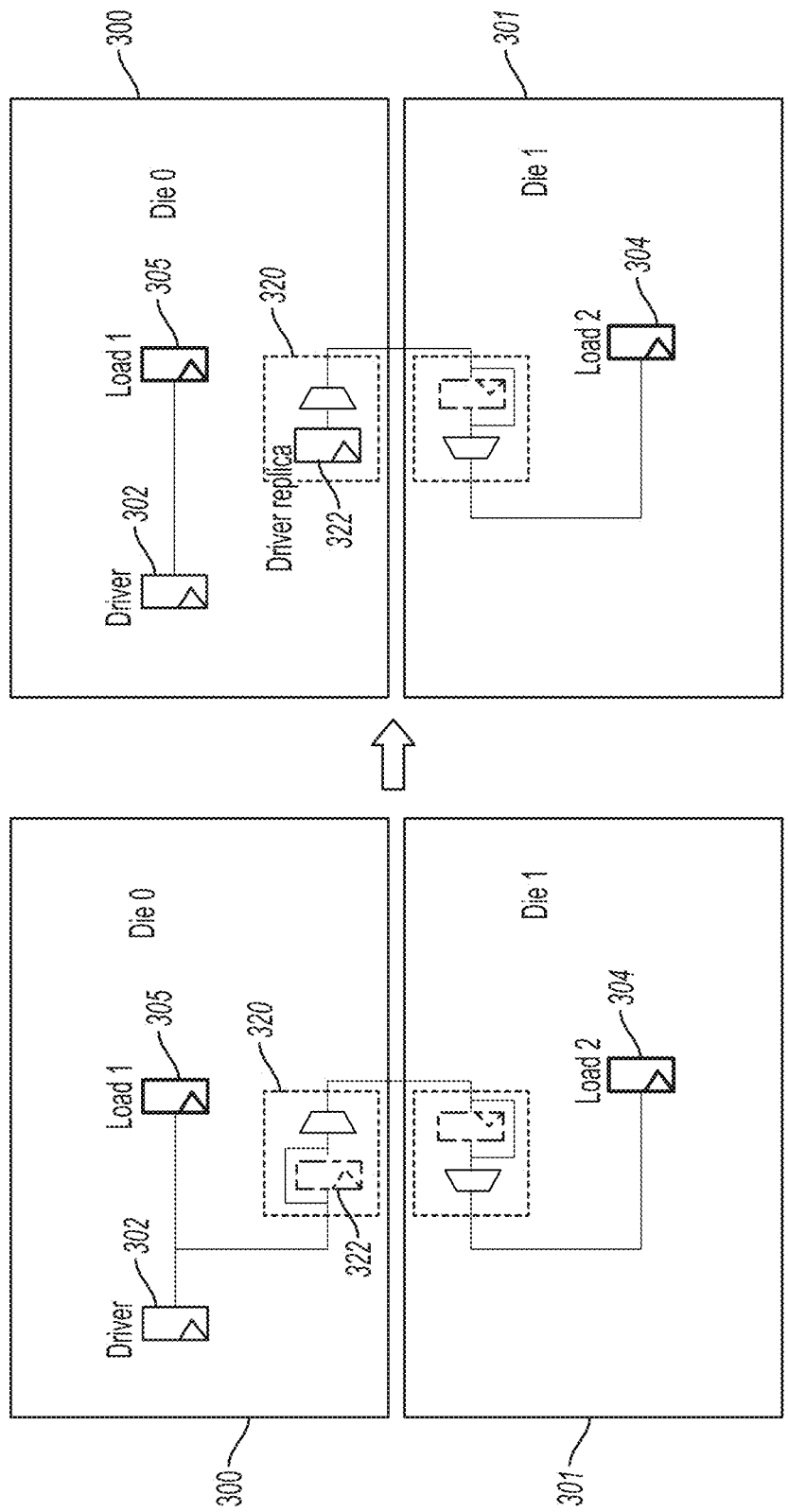

US 10,572,621 B1

PHYSICAL SYNTHESIS WITHIN PLACEMENT

TECHNICAL FIELD

This specification relates to integrated circuits (ICs) and, more particularly, to performing physical synthesis optimizations to facilitate timing improvements in circuit designs for ICs.

BACKGROUND

Implementing a circuit design within an integrated circuit (IC), whether a programmable IC or an application specific IC (ASIC), entails processing the circuit design through a design flow. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

Synthesis may also include mapping. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned.

Routing is the process of selecting particular routing resources such as wires, PIPs, PIP settings, and/or other interconnect circuitry to electrically couple the various circuit blocks of the target IC after placement.

Modern circuit designs often have aggressive timing requirements. Significant time is spent processing the circuit design through the design flow in an attempt to meet these timing requirements. One way of meeting timing requirements, or "closing timing," is to select one or more signal paths of the circuit design and perform timing optimization on the selected signal paths. The particular signal paths to optimize to achieve timing closure, however, are not easily determined. Furthermore, when trying to improve timing performance after routing has been performed, there is very little flexibility in how much the design can be changed.

SUMMARY

This specification describes how a system can perform physical synthesis within an overall placement process of an integrated circuit design. This means that physical synthesis optimizations can be used to modify a netlist before some components are assigned a final location on the IC.

In general, one innovative aspect of the subject matter described in this specification can be embodied in methods that include the actions of receiving an initial netlist of a circuit design for an IC; performing a global placement process that assigns to some components in the initial netlist a respective initial location on the IC; and performing one or more physical synthesis processes to generate a modified netlist before assigning a final location to all components in the circuit design by the overall placement process; and performing a subsequent placement process to assign a final location on the IC to all components in the modified netlist. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The overall placement process comprises the global placement process and a detail placement process, and wherein generating the modified netlist comprises generating the modified netlist after the global placement process and before the detail placement process. Generating the modified netlist occurs after some components have been assigned an initial location by the global placement process and before an initial location is modified by the detail placement process. The IC is a multi-die device having a first die connected with a second die, and wherein performing the one or more physical synthesis processes comprises: determining that a driver in the initial netlist has an initial location on the first die and that a load of the driver in the initial netlist has an initial location on the second die; and in response, modifying the initial netlist including moving the driver to a transmit site of a channel between the first die and the second die, moving the load to a receive site of the channel, or both. The actions include modifying the initial netlist including replicating the driver and assigning the replicated driver a location on the first die. The initial netlist comprises a driver and a plurality of loads having respective initial locations on the IC, and the actions include computing a fanout factor between the driver and the plurality of loads; computing a slack factor between the driver and one or more of the plurality of loads; determining that the fanout factor and the slack factor satisfy respective thresholds; in response, performing a clustering algorithm on the plurality of loads to assign each load to a particular cluster of a plurality of clusters; and modifying the initial netlist to replicate the driver for one or more of the plurality of clusters. The threshold for the fanout factor is a user-specified threshold. Determining that the fanout factor satisfies a threshold comprises: determining that the plurality of loads are part of a same macro device; obtaining a custom fanout threshold that is specific to the macro device; and determining that the fanout factor satisfies the custom fanout threshold that is specific to the macro device. The macro device is a shift register, a block ram, an ultra ram, or a digital signal processor. The driver and the plurality of loads are part of a reset net. The actions include modifying the initial netlist to generate one or more additional upstream drivers, wherein each additional upstream driver in the modified netlist becomes a load of the driver in the initial netlist.

Particular embodiments of the subject matter described in this specification can be implemented so as to realize one or more of the following advantages. Performing physical synthesis during placement results in faster timing closure and faster design convergence. Performing physical synthesis within placement also affords greater flexibility to perform certain kinds of netlist optimizations because final locations have not yet been assigned. This makes some problematic designs more feasible. For example, the drawbacks of generating reset nets with very high fanout can be significantly reduced by performing physical synthesis during placement.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B illustrate moving a driver to a transmit site of an inter-die communication channel.

FIGS. 3C and 3D illustrate moving a load to a receive site of an inter-die communication channel.

FIGS. 3E-3F illustrate replicating a driver at a transmit site of an inter-die communication channel.

Like reference numbers and designations in the various drawings indicate like elements.

DETAILED DESCRIPTION

This specification describes techniques for performing physical synthesis during the placement stage of an IC design flow. In this specification, physical synthesis means modifying a netlist of physical IC components within an overall placement process. This means that the netlist is altered after some aspects of the placement process have assigned initial locations to some physical IC components but before all the placement process has assigned final locations to all IC components. Thus, a netlist of physical IC components can be modified by: replicating components, replacing components, adding components, and deleting components, to name just a few examples.

Figure 1:
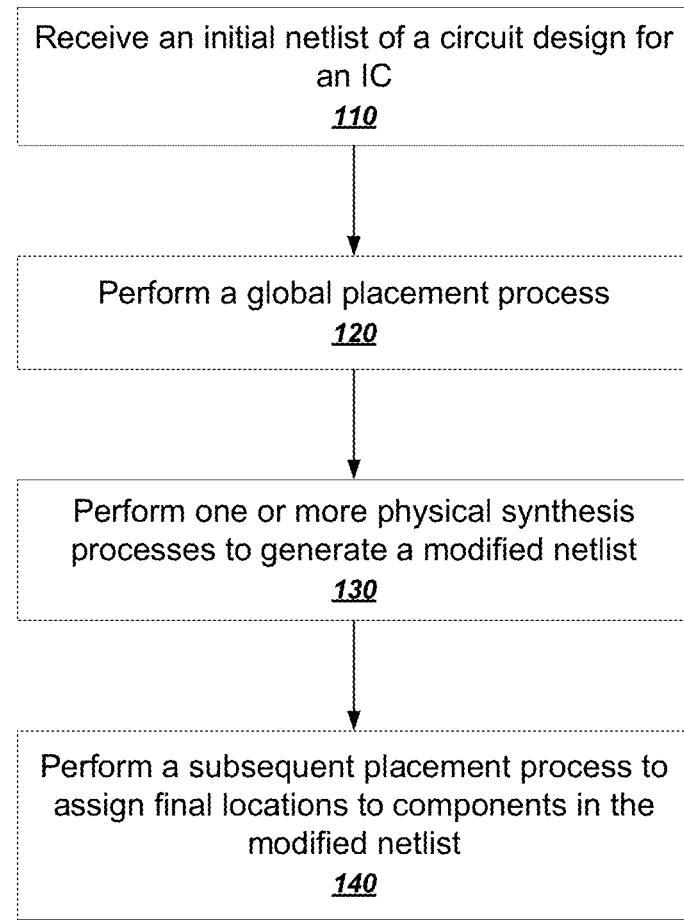
FIG. 1 is a flowchart of an example process for performing physical synthesis within an overall placement process

FIG. 1 is a flowchart of an example process for performing physical synthesis within an overall placement process.

As described above, IC design flows generally perform placement after synthesis and before routing. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives an initial netlist of a circuit design for an IC (110). The initial netlist is a result of a synthesis process that operates on a programmatic description of a circuit. In general, a netlist specifies a plurality of components and specifies which components have a connection to which other components in the netlist.

The system performs a global placement process (120). The global placement process assigns an initial location on the IC to some or all components in the initial netlist. The global placement process performs one or more global optimization algorithms that can take various factors into consideration, including balanced assignment on the IC and estimated timing performance to name just a few examples. Typically, the global optimization algorithms rely on the netlist remaining the same while the global placement process is performed.

The system performs one or more physical synthesis processes to generate a modified netlist (130). In this context, physical synthesis refers to using the physical components of the netlist to alter the netlist. In that sense, physical synthesis can be distinguished from logic synthesis, which generates netlist components uses a programmatic behavioral description rather than an initial netlist. In other words, physical synthesis takes a netlist as input, whereas logic synthesis takes a programmatic behavioral description as input.

The system can perform a variety of physical synthesis processes to generate a modified netlist. Some physical synthesis processes improve the timing performance of connections that span dies on multi-die ICs. Example techniques are described in more detail below with reference to FIG. 3. Other physical synthesis processes improve the timing from high-fanout nets. Such techniques are described in more detail below with reference to FIG. 5.

The system performs a subsequent placement process to assign final locations to components in the modified netlist (140). In some implementations, the subsequent placement process is a detail placement process that modifies the placement of relatively small batches of components in order to optimize the timing performance of the components. However, like the global placement process, the detail placement processes typically modify only the location assignments of the netlist rather than modifying the netlist itself.

Figure 2:
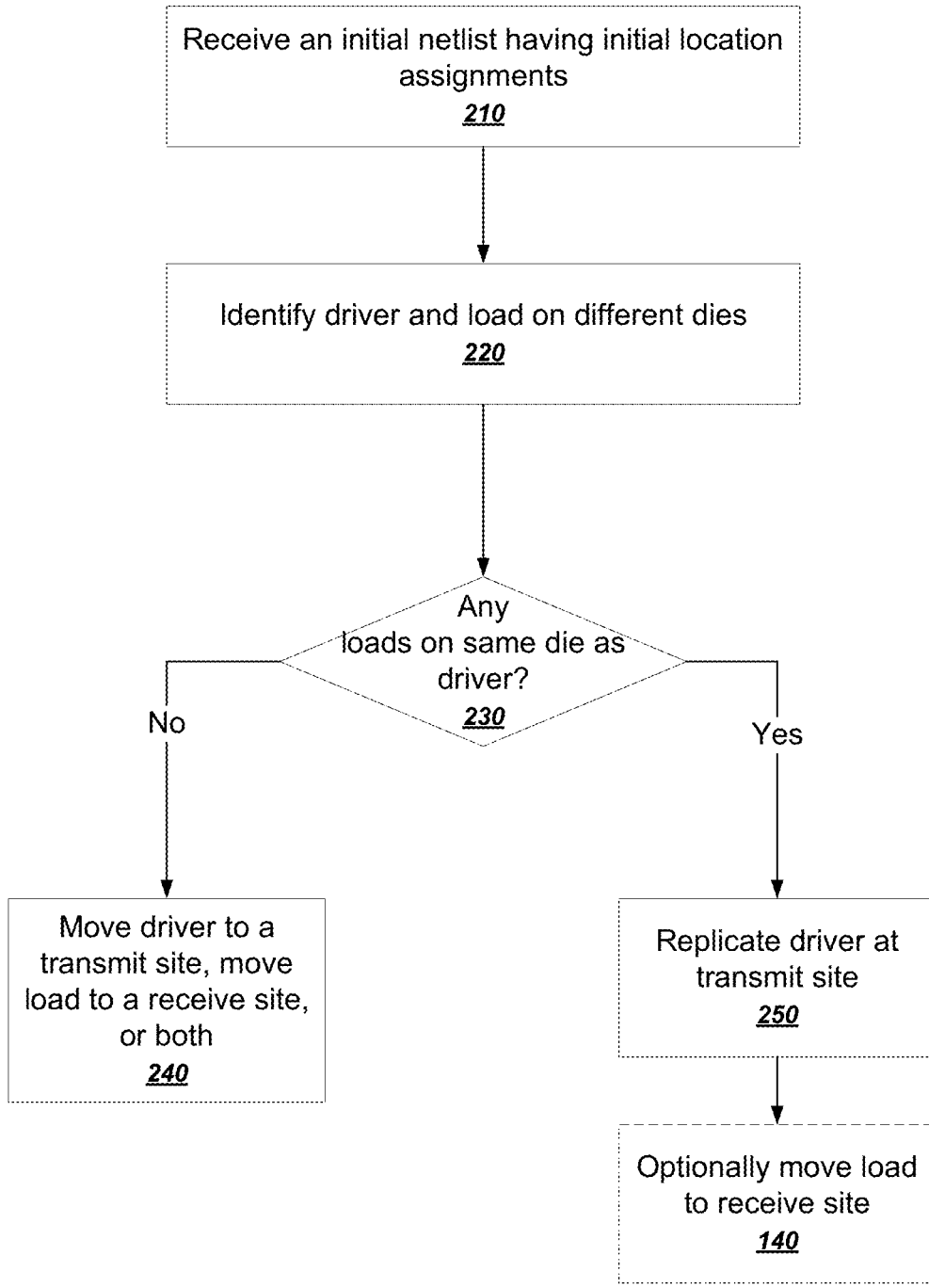
FIG. 2 is a flowchart of an example process for performing physical synthesis for drivers having loads spanning multiple dies in a multi-die IC.

FIG. 2 is a flowchart of an example process for performing physical synthesis for drivers having loads spanning multiple dies in a multi-die IC. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives an initial netlist having initial location assignments (210). As described above, the initial netlist can be generated by a logic synthesis process, and the initial location assignments can be generated by a global placement process.

The system identifies a driver and a corresponding load on different dies (220). The initial locations assigned by the global placement process can result in some drivers and their corresponding loads being placed on different dies of a multi-die IC.

A driver is an IC component that generates a signal that is eventually consumed by a corresponding load, which is another IC component. Often, each driver and load is a flip-flop or a latch, although other components can also serve as drivers and loads. For example, a driver can be a single flip-flop having a load that is a macro device, e.g., a look-up table or a digital signal processor (DSP).

Multi-die ICs are devices that package together multiple dies using integrated communication channels. Multi-die ICs can be built using a variety of packaging technologies, including silicon interposers, interconnect bridges, and die stacking, to name just a few examples. Multi-die ICs are used for connecting multiple, possibly heterogeneous, dies into a single package. Multi-die ICs also are also used to reduce manufacturing cycle time and to increase manufacturing yield by building larger numbers of smaller, more reliable dies rather than smaller numbers of larger, less reliable monolithic dies.

Regardless of the specific packaging technology used for a multi-die device, the communications channels between the dies are almost always slower than connections within a single die. Therefore, drivers and loads placed on different dies can cause timing problems in the design. This is because even though no routing has been performed yet, the driver and load will necessarily rely on an inter-die communication channel by virtue of being on different dies.

The system can therefore improve the timing performance of the design by modifying the netlist to make use of transmit sites, receive sites, or both, of inter-die communication channels.

Each transmit site is a component that is configured to select between multiple inputs in order to control which data is sent over an inter-die communication channel. Each transmit site has one or more dedicated flip-flops. The global placement process generally does not make use of such dedicated flip-flops of transmit sites because selecting a dedicated flip-flop of a transmit site as a driver can constrain the communication channel that will be used to drive the corresponding loads. In particular, in some chip implementations, a dedicated flip-flop of a transmit site can only drive loads on a different die. Therefore, during the placement stage, most if not all dedicated flip-flops of transmit sites are unused.

Similarly, each receive site is a component that is configured to select between multiple inputs in order to control which data received over the communication channel is transmitted to other components. Each receive site also has one or more dedicated flip-flops that the global placement process generally does not allocate. A dedicated flip-flop of a receive site can only receive data from a different die over the corresponding communication channel. And during placement, most if not all dedicated flip-flops are receive sites are unused.

Accordingly, the system can improve the timing performance of the design by modifying the netlist to move the driver to a transmit site of a communication channel. In other words, the driver is moved to a dedicated flip-flop of the transmit site.

The system can alternatively or in addition modify the netlist to move the load to a receive site of a communication channel. In doing so, the load is moved to a dedicated flip-flop of the receive site.

The system can alternatively or in addition replicate the driver at a transmit site of a communication channel. In doing so, the original driver is maintained, and a second, replica driver is placed at a transmit site. Replicating a driver generally involves modifying the netlist to specify a second driver that receives the same inputs as the original driver.

The system determines if there are any loads on the same die as the driver (230). If not, the system moves the driver to a transmit site, moves the load to a receive site, or both (branch to 240).

FIGS. 3A and 3B illustrate moving a driver to a transmit site. In FIG. 3A, a driver 302 on a first die 300 has a load 304 on a second die 301. An integrated communication channel between the first die 300 and the second die 301 includes a transmit site 320 and a receive site 330.

The transmit site 320 includes a dedicated flip-flop 322 and selection logic 324, e.g., a multiplexer, that selects between the dedicated flip-flop 322 or other drivers on the first die 300.

The receive site 330 includes a dedicated flip-flop 332 and selection logic 334 that selects between the dedicated flip-flop 332 and data received over the communication channel.

For clarity, FIGS. 3A-3E illustrates the components as having fully wired up connections. However, in the context of performing physical synthesis during placement, e.g., just after the global placement process, the system may only have information indicating that the driver 302 is on the first die 300 and that the corresponding load 304 is on the second die 301.

FIG. 3B illustrates moving the driver 302 to the dedicated flip-flop 322 of the transmit site 320. Moving the driver in this way involves modifying the netlist so that any inputs to the original driver 302 become inputs to the dedicated flip-flop 322 of the transmit site 320.

After moving the driver 302 to the transmit site 320, the length between the driver and its corresponding load has been shortened, which can improve the timing performance of the design.

FIGS. 3C and 3D illustrate moving a load to a receive site. In FIG. 3C, the dedicated flip-flop 332 of the receive site 330 is unused.

As shown in FIG. 3D, the system can move the load 304 on the second die 301 to the dedicated flip-flop 322 of the receive site 330. This move involves modifying the netlist so that any outputs of the original load 304 become outputs of the dedicated flip-flop 332 of the receive site 330.

And the modifications shown in FIGS. 3A-3D are not mutually exclusive. In particular, the system can both move the driver to the transmit site and move the load to the receive site.

As shown in FIG. 2, if there were loads on the same die as the driver, the system replicates the driver at a transmit site (branch to 250). As described above, one effect of moving the driver to a transmit site is that the driver can no longer drive loads on the same die. In other words, the only place for data to go from a dedicated flip-flop of a transmit site is over the communication channel to a different die.

Therefore, if a driver does also drive loads on the same die, the system can replicate the driver at the transmit site rather than merely moving the driver.

FIGS. 3E-3F illustrate replicating a driver at a transmit site. In FIG. 3E, a driver 302 drives multiple loads: a first load 305 on the same die, and a second load 304 on a different die. The system generally cannot simply move the driver 302 to the transmit site 320 because then the driver would be unable to drive the first load 305 on the same die.

Therefore, the system replicates the driver 302 using the dedicated flip-flop 322 of the transmit site 320. This change modifies the netlist so that any inputs to the driver 302 also become inputs to the dedicated register 322 of the transmit site 320. In addition, the netlist is modified to reflect that the dedicated register 322 of the transmit site 320 is now driving the load 304, rather than the original driver 302.

As shown in FIG. 2, even when replicating the driver at a transmit site, the system can also optionally move the load to the receive site because the two modifications are not mutually exclusive.

Figure 4:
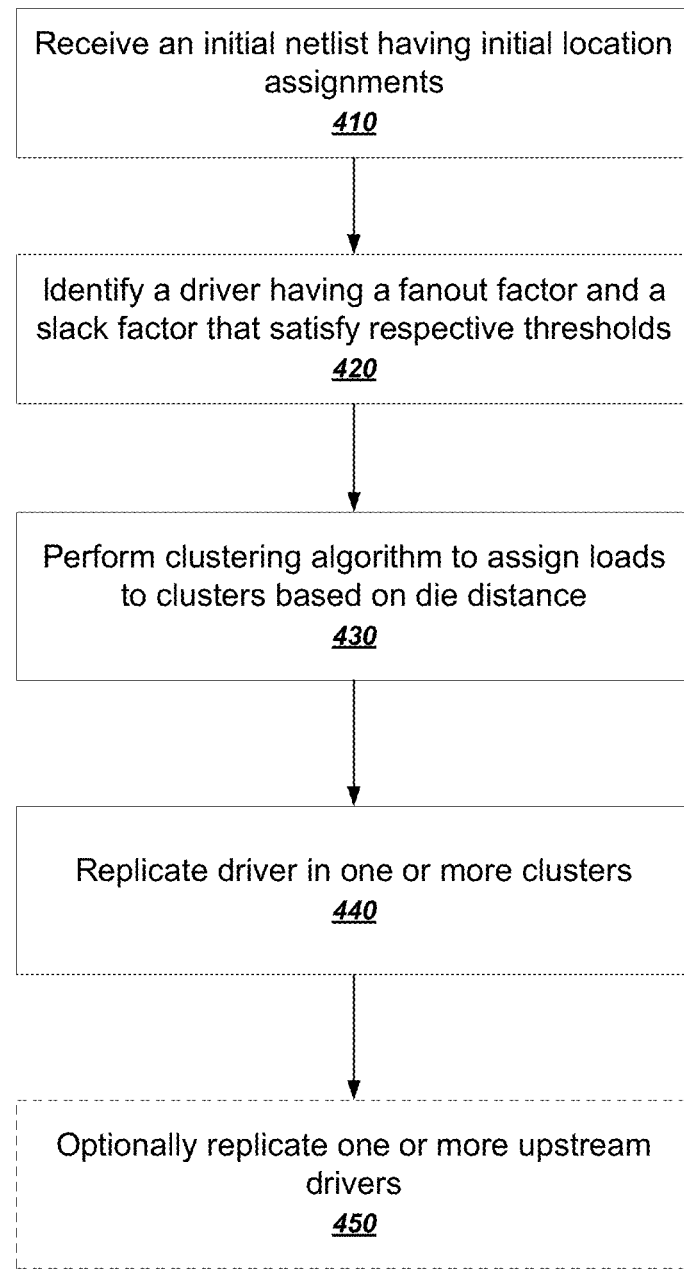
FIG. 4 is a flowchart of an example process for replicating drivers for high-fanout nets.

FIG. 4 is a flowchart of an example process for replicating drivers for high-fanout nets. For convenience, the process will be described as being performed by a system of one or more computers, located in one or more locations, and programmed appropriately in accordance with this specification. For example, an electronic design automation application, e.g., the application 755 of computer system 700 of FIG. 7, appropriately programmed, can perform the example process.

The system receives an initial netlist having initial location assignments (410). As described above, the initial netlist can be generated by a logic synthesis process, and the initial location assignments can be generated by a global placement process.

The system identifies a driver having a fanout factor and a slack factor that satisfy respective thresholds (420).

The fanout factor is a measure of the number of loads that a particular driver has. Thus, the system can determine if any single driver in the netlist has more than N loads, where N is a customizable system parameter that controls the fanout factor that should be accounted for during placement.

The slack factor is a measure of the worst case slack between the driver and any of its loads. The slack factor is a timing metric that indicates how far above or below a timing requirement the design is. Note that during placement, before routing occurs, the actual slack values may only be estimates based on the straight-line distance between the driver and each of its loads rather than on the properties of actual routing resources.

If a driver has a sufficiently severe fanout factor, but not a slack factor, the design may not need to be modified because the design may satisfy the timing requirements. On the other hand, if a driver has a sufficiently severe slack factor, but not a fanout factor, the system may need to move the location of the driver.

But if the system identifies a driver with both a sufficiently severe fanout factor and slack factor, the system can replicate the driver one or more times to improve both factors.

To do so, the system performs a clustering algorithm to assign loads to clusters based on die distance (430). The system can use any appropriate clustering algorithm to assign loads to clusters. The clustering algorithm can take a number of predetermined parameters that relate to distance as well as fanout factor without a cluster. For example, the clustering algorithm can use a parameter that specifies a maximum number of loads in a cluster, as well as a maximum distance within the cluster, either between every loads or from some representative point within the cluster, e.g., an average or a center of mass of the cluster.

The system replicates the driver in one or more clusters (440). The system can modify the netlist by adding a driver replica and changing loads of the original driver belonging to the cluster become loads of the driver replica. During this process, the system can replicate groups of multiple components as the driver. In other words, rather than simply replicating single components, the system can replicate a group of components by modifying the netlist so that loads of the original group of components become loads of the replicated group of components.

Figure 5B:
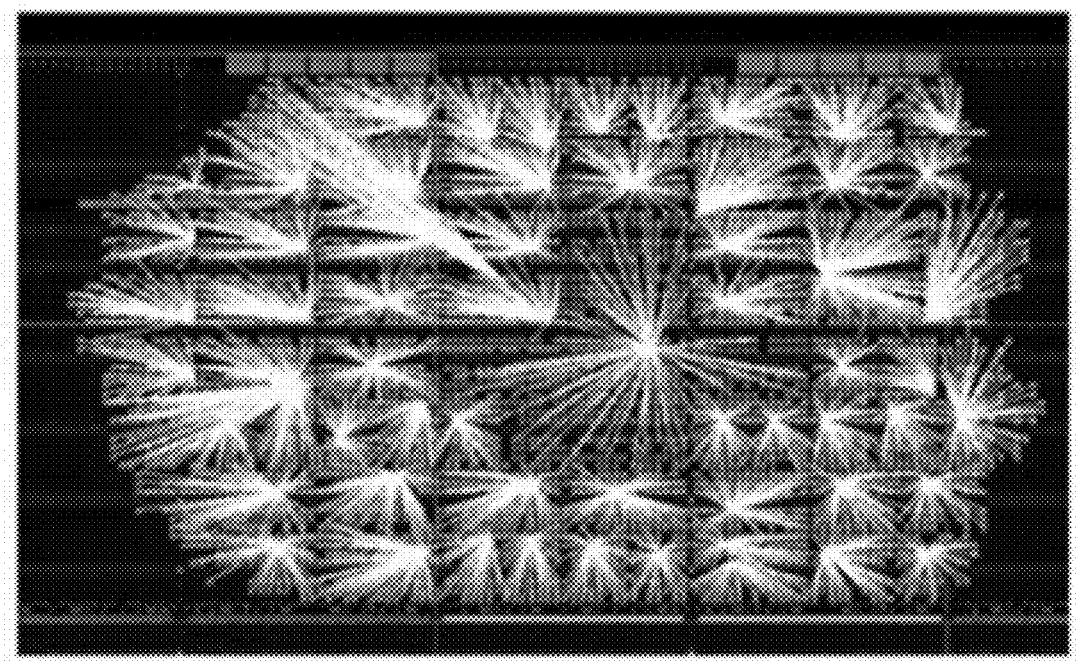
FIGS. 5A-5B illustrate using clustering to reduce the effects of high-fanout nets.
Figure 5A:
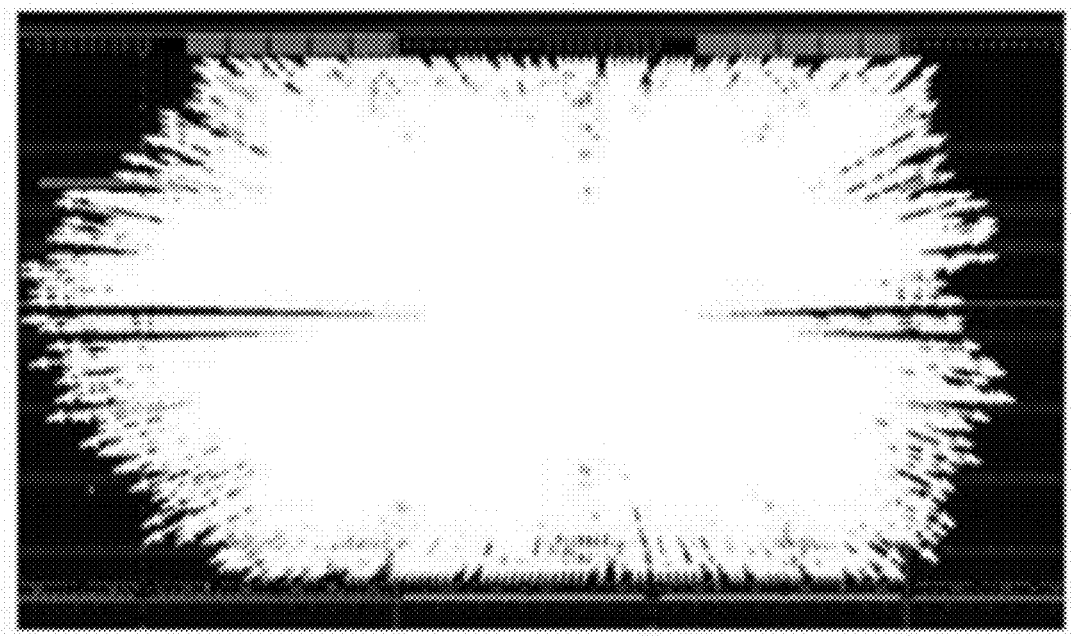

FIGS. 5A-5B illustrate using clustering to reduce the effects of high-fanout nets. In FIG. 5A, a single driver has both many loads as well as loads that are far away. Note that since no routing has occurred yet, the connections illustrated in FIG. 5A merely illustrate straight-line distance between a driver and its loads. FIG. 5A illustrates that this single driver has both a fanout factor and a slack factor that satisfy respective thresholds.

In FIG. 5B, a clustering algorithm has been performed that groups the loads into respective clusters. Then, the system modifies the netlist by replicating the original driver within each cluster.

Some components may require special handling while evaluating the fanout factor and slack factor. In particular, some macro devices may benefit from driver replication even though they do not meet the baseline fanout and slack factors.

A macro device is a prepackaged component of a circuit design. Macro devices include shift-registers, block RAMS, ultra RAMs, and digital signal processors (DSPs), to name just a few examples.

Figure 5D:
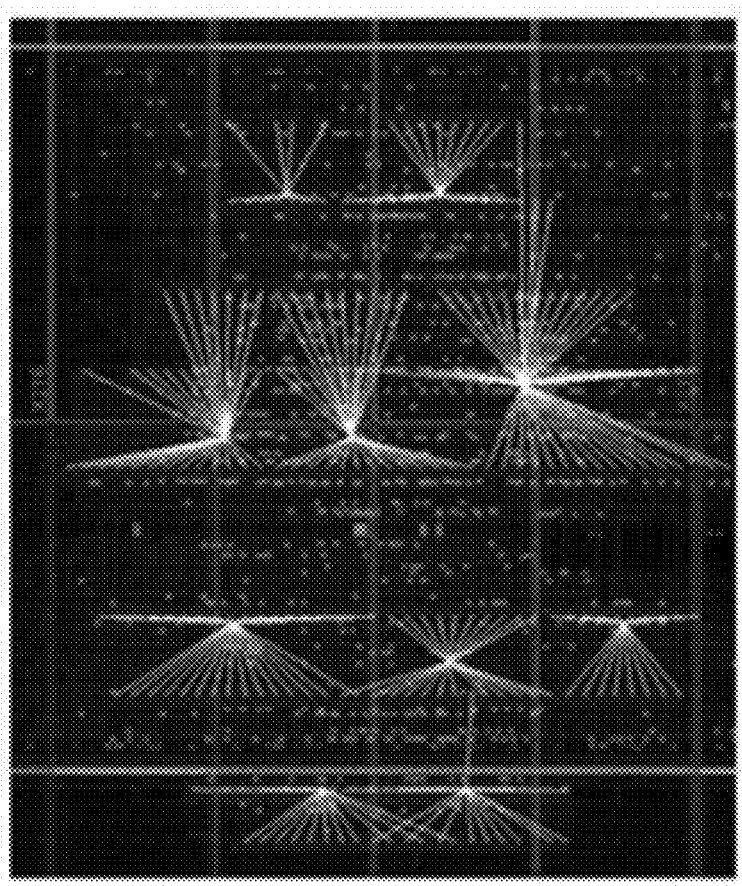
FIGS. 5C-D illustrate using clustering for a single driver that has multiple loads on macro devices.
Figure 5C:
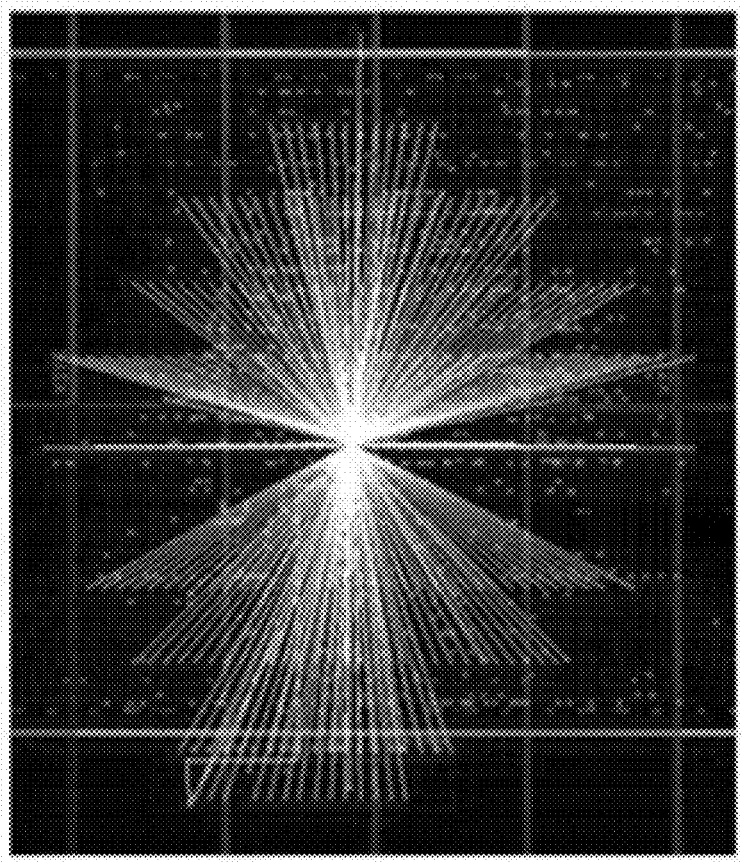

After the global placement process has completed, macro devices tend to be oriented along columns of the circuit design. FIG. 5C illustrates a single driver that has multiple loads on macro devices. From FIG. 5C, it can be seen that although the fanout factor is not high, some of the connections are very long, and therefore, may have a sufficiently severe slack factor.

Therefore, in some implementations, the system can use different values for the fanout factor if one or more loads are macro devices. In other words, the system can determine that the fanout factor satisfies an fanout threshold for a macro device and in response perform a clustering algorithm that groups the loads into respective clusters as shown in FIG. 5D. In addition, the system can use a different fanout threshold that is specific to each kind of macro device supported by the design.

In some implementations, the system can also use a user-specified threshold for the fanout factor for all or a portion of the design. This is useful for when a designer knows that some signals are more critical than others. The design can therefore specify that the system should be more aggressive when replicating drivers in the fanout net. This can result in the system performing the clustering process and generating driver replicas for portions of the design that it otherwise would not have.

Another important use case for clustering is reset nets. A reset net is a design component that allows for rapid resetting of flip-flops in a circuit implementation. Reset nets naturally tend to have a high fanout factor, and as a result, designers have learned to avoid reset nets due to the high fanout.

However, the clustering approach described here for performing physical synthesis during placement allows reset nets with very high fanout to be handled more efficiently. This therefore increases the likelihood that a design with a high-fanout reset net will still meet timing requirements.

As shown in FIG. 4, the system optionally replicates one or more upstream drivers (450). After performing the clustering process and replicating the driver within each cluster, the fanout net will have at least two levels of drivers: a first level having the original driver, a second level having one or more replicas.

Figure 6A:
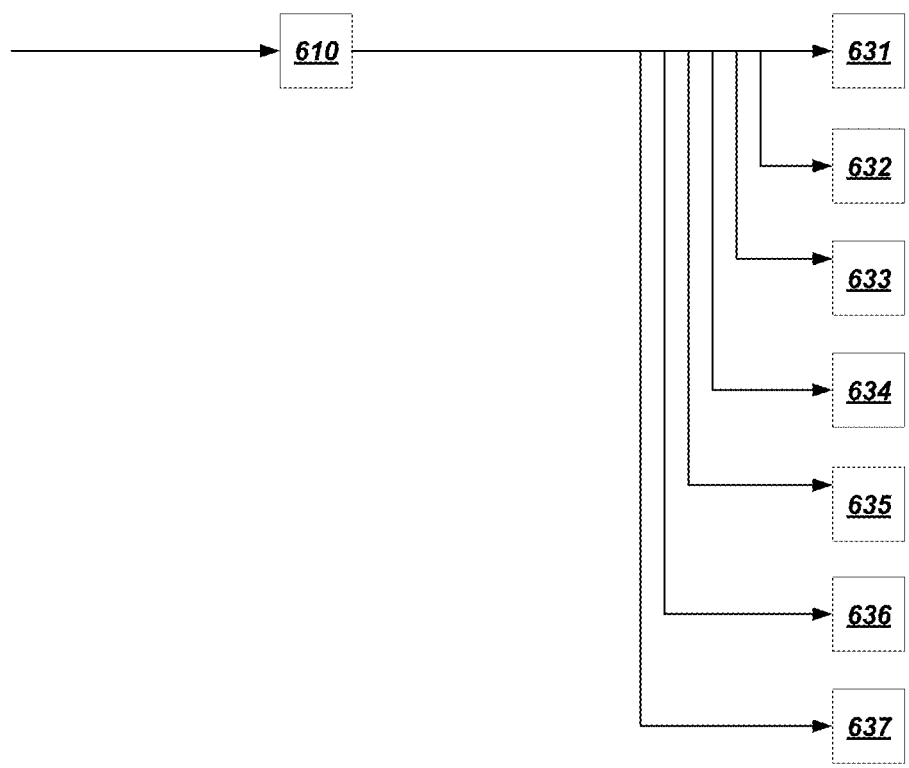
FIGS. 6A-C illustrate replicating an upstream driver on a high-fanout net.

FIG. 6A illustrates an original high-fanout net. In FIG. 6A, a driver 610 drives seven loads 631-637.

Figure 6B:
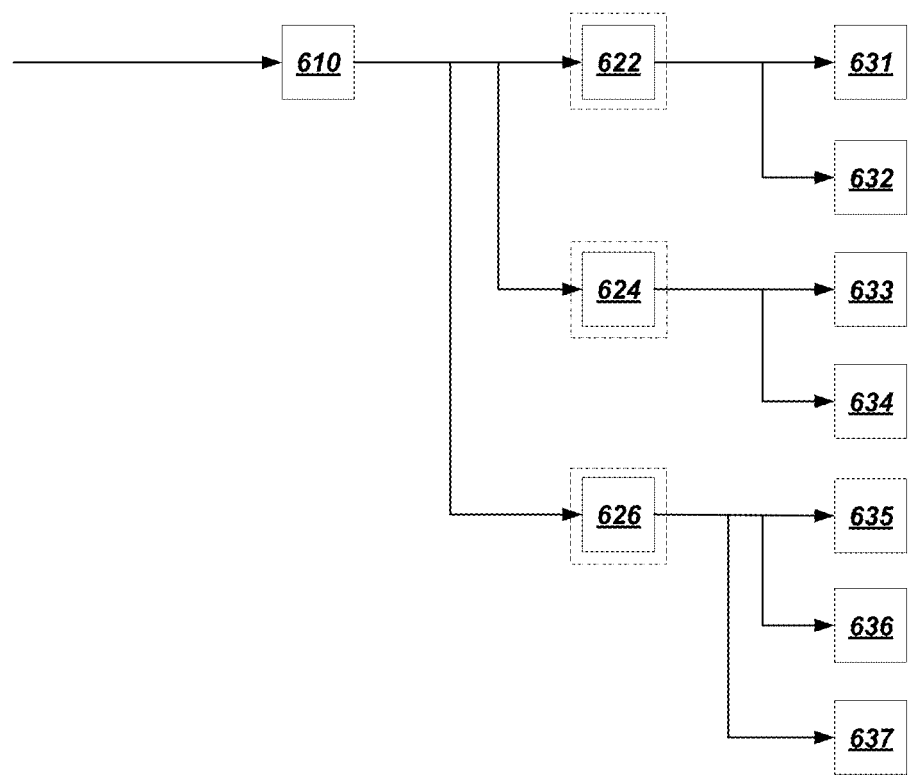

FIG. 6B illustrates the fanout net after performing clustering and driver replication. In particular, the netlist has been modified to add three new replicas 622, 624, and 626, which are replicas of the original driver 610. Thus, the modified netlist has two levels of drivers: the original driver 610 and the replica drivers 622, 624, and 626.

Timing problems can still arise if the driver 610 is driving many second-level replicas. This is because any of the replicas may still be placed too far away from the original driver 610. The likelihood of a timing problem occurring due to the second-level replicas increases as the number of second-level replicas driven by the driver increases.

Figure 6C:
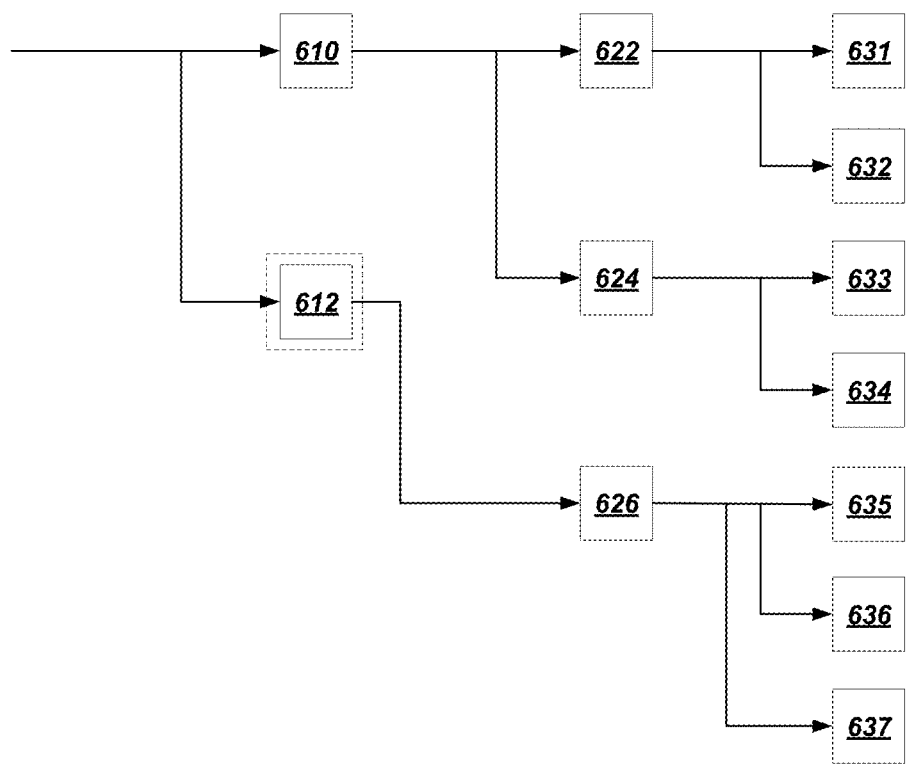

Therefore, to address this problem, the system can create additional upstream replicas. FIG. 6C illustrates inserting an additional upstream replica. A new, upstream replica 612 has been added to the netlist to drive replica 626. The original driver 610 now only drives two replicas 622 and 624. In this context, the term upstream replica is used to denote a driver replica that is upstream from any replicas generated by the clustering process. For example, the upstream replica 626 is upstream from any of the replicas 622, 624, and 626 generated by the clustering process.

Then, during subsequent placement procedures, the system can place the additional upstream replica 612 at a position that reduces the likelihood that timing problems will arise from the high-fanout net.

Figure 7:
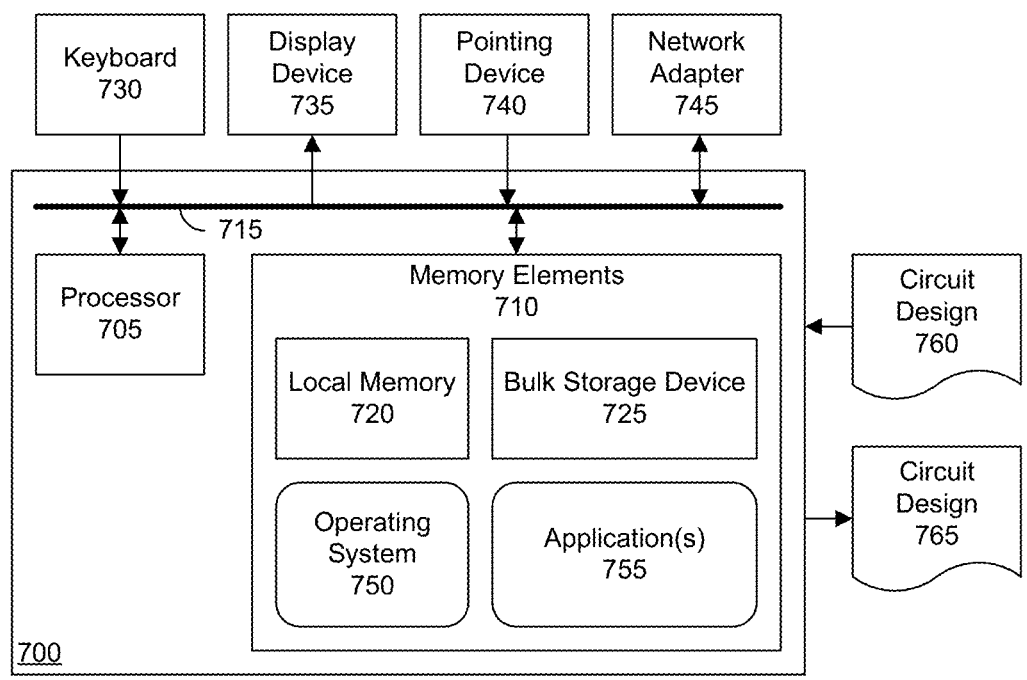
FIG. 7 is a block diagram illustrating an example data processing system.

FIG. 7 is a block diagram illustrating an example data processing system 700. As pictured, system 700 includes at least one processor, e.g., a central processing unit (CPU), 705 coupled to memory elements 710 through a system bus 715 or other suitable circuitry. System 700 stores program code (e.g., computer readable program instructions) within memory elements 710. Processor 705 executes the program code accessed from memory elements 710 via system bus 715. Memory elements 710 include one or more physical memory devices such as, for example, a local memory 720 and one or more bulk storage devices 725. Local memory 720 refers to random access memory (RAM) or other non-persistent memory device(s) generally used during actual execution of the program code. Bulk storage device 725 may be implemented as a hard disk drive (HDD), solid state drive (SSD), or other persistent data storage device. System 700 may also include one or more cache memories (not shown) that provide temporary storage of at least some program code in order to reduce the number of times program code must be retrieved from bulk storage device 725 during execution.

Input/output (I/O) devices such as a keyboard 730, a display device 735, and a pointing device 740 may optionally be coupled to system 700. In some cases, one or more of the I/O devices may be combined as in the case where a touchscreen is used as display device 735. In that case, display device 735 may also implement keyboard 730 and pointing device 740.

The I/O devices may be coupled to system 700 either directly or through intervening I/O controllers. One or more network adapters 745 may also be coupled to system 700 to enable system 700 to become coupled to other systems, computer systems, remote printers, and/or remote storage devices through intervening private or public networks. Modems, cable modems, Ethernet cards, and wireless transceivers and/or radios are examples of different types of network adapter 745 that may be used with system 700. Depending upon the particular implementation of system 700, the specific type of network adapter, or network adapters as the case may be, will vary.

As pictured in FIG. 7, memory elements 710 may store an operating system 750 and one or more applications 755. Application 755, for example, may be an EDA application. In one aspect, operating system 750 and application 755, being implemented in the form of executable program code, are executed by system 700 and, in particular, by processor 705. As such, operating system 750 and application 755 may be considered an integrated part of system 700. Operating system 750, application 755, and any data items used, generated, and/or operated upon by system 700 are functional data structures that impart functionality when utilized by system 700.

In one aspect, system 700 may be a computer or other device that is suitable for storing and/or executing program code. System 700 may represent any of a variety of computer systems and/or devices that include a processor and memory and that are capable of performing the operations described within this disclosure. In some cases, the particular computer system and/or device may include fewer components or more components than described. System 700 may be implemented as a single system as shown or as a plurality of networked or interconnected systems each having an architecture the same as, or similar to, that of system 700.

In operation, system 700 may receive a circuit design 760. Circuit design 760 is a programmatic description of an electronic system. For example, circuit design 760 may be specified as one or more hardware description language (HDL) files, one or more netlist(s), a register transfer level description, or the like. System 700 may perform a design flow on circuit design 760 resulting in circuit design 765. In one aspect, circuit design 765 may be synthesized, placed, and routed by system 700. Further, system 700 may perform physical synthesis within an overall placement process of circuit design 760 as part of the design flow.

Figure 8:
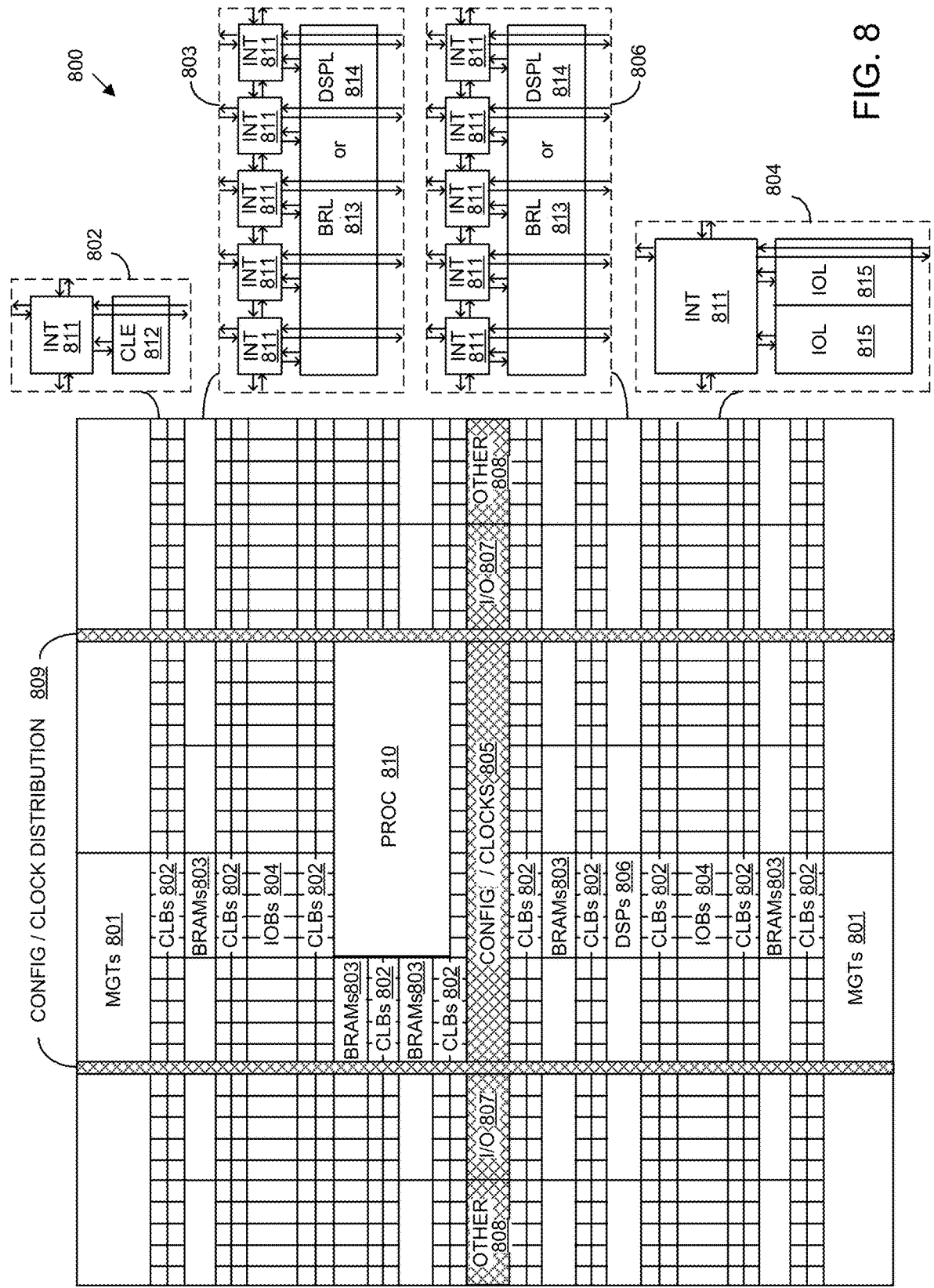
FIG. 8 is a block diagram illustrating an example architecture for an IC.

FIG. 8 is a block diagram illustrating an example architecture 800 for an IC. In one aspect, architecture 800 may be implemented within a programmable IC. For example, architecture 800 may be used to implement a field programmable gate array (FPGA). Architecture 800 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the top of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An 10B 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a columnar area near the center of the die, e.g., formed of regions 805, 807, and 808, may be used for configuration, clock, and other control logic. Horizontal areas 809 extending from this column may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 8 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

In one aspect, a circuit design may be processed as described herein for implementation within a target IC that uses architecture 800 or an architecture similar to architecture 800. It should be appreciated that the inventive arrangements described within this disclosure may also be used for circuit designs that may be implemented as ASICs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method of performing one or more physical synthesis processes during an overall placement process for components on an integrated circuit (IC), the method comprising:
   receiving an initial netlist of a circuit design for the IC;
   performing a global placement process that assigns to some components in the initial netlist a respective initial location on the IC;
   performing one or more physical synthesis processes to generate a modified netlist before assigning a final location to all components in the circuit design by the overall placement process;
   performing a subsequent placement process to assign a final location on the IC to all components in the modified netlist;
   wherein the overall placement process comprises the global placement process and a detail placement process, and wherein generating the modified netlist comprises generating the modified netlist after the global placement process and before the detail placement process; and
   wherein generating the modified netlist occurs after some components have been assigned an initial location by the global placement process and before an initial location is modified by the detail placement process.

2. The method of claim 1, further comprising:
   assigning loads of a net to clusters based on die distance; and
   replicating a driver of one or more of the clusters.

3. The method of claim 2, further comprising:
   replicating one or more upstream drivers of the net.

4. The method of claim 1, wherein the IC is a multi-die device having a first die connected with a second die, and wherein performing the one or more physical synthesis processes comprises:
   determining that a driver in the initial netlist has an initial location on the first die and that a load of the driver in the initial netlist has an initial location on the second die; and
   in response, modifying the initial netlist including moving the driver to a transmit site of a channel between the first die and the second die, moving the load to a receive site of the channel, or both.

5. The method of claim 4, further comprising modifying the initial netlist including replicating the driver and assigning the replicated driver a location on the first die.

6. The method of claim 1, wherein the initial netlist comprises a driver and a plurality of loads having respective initial locations on the IC, and further comprising:
   computing a fanout factor between the driver and the plurality of loads;
   computing a slack factor between the driver and one or more of the plurality of loads;
   determining that the fanout factor and the slack factor satisfy respective thresholds;
   in response, performing a clustering algorithm on the plurality of loads to assign each load to a particular cluster of a plurality of clusters; and
   modifying the initial netlist to replicate the driver for one or more of the plurality of clusters.

7. The method of claim 6, wherein the threshold for the fanout factor is a user-specified threshold.

8. The method of claim 6, wherein determining that the fanout factor satisfies a threshold comprises:
   determining that the plurality of loads are part of a same macro device;
   obtaining a custom fanout threshold that is specific to the macro device; and
   determining that the fanout factor satisfies the custom fanout threshold that is specific to the macro device.

9. The method of claim 8, wherein the macro device is a shift register, a block ram, an ultra ram, or a digital signal processor.

10. The method of claim 6, wherein the driver and the plurality of loads are part of a reset net.

11. The method of claim 6, further comprising: modifying the initial netlist to generate one or more additional upstream drivers, wherein each additional upstream driver in the modified netlist becomes a load of the driver in the initial netlist.

12. A system comprising:
   one or more computers and one or more storage devices storing instructions that are operable, when executed by the one or more computers, to cause the one or more computers to perform operations of one or more physical synthesis processes during an overall placement process for components on an integrated circuit (IC), the operations comprising:
   receiving an initial netlist of a circuit design for the IC;

performing a global placement process that assigns to some components in the initial netlist a respective initial location on the IC;

performing one or more physical synthesis processes to generate a modified netlist before assigning a final location to all components in the circuit design by the overall placement process;

performing a subsequent placement process to assign a final location on the IC to all components in the modified netlist;

wherein the overall placement process comprises the global placement process and a detail placement process, and wherein generating the modified netlist comprises generating the modified netlist after the global placement process and before the detail placement process; and wherein generating the modified netlist occurs after some components have been assigned an initial location by the global placement process and before an initial location is modified by the detail placement process.

13. The system of claim 12, further comprising:
assigning loads of a net to clusters based on die distance; and
replicating a driver of one or more of the clusters.

14. The system of claim 13, further comprising:
replicating one or more upstream drivers of the net.

15. The system of claim 12, wherein the IC is a multi-die device having a first die connected with a second die, and wherein performing the one or more physical synthesis processes comprises:
determining that a driver in the initial netlist has an initial location on the first die and that a load of the driver in the initial netlist has an initial location on the second die; and
in response, modifying the initial netlist including moving the driver to a transmit site of a channel between the first die and the second die, moving the load to a receive site of the channel, or both.

16. The system of claim 15, wherein the operations further comprise modifying the initial netlist including replicating the driver and assigning the replicated driver a location on the first die.

17. The system of claim 12, wherein the initial netlist comprises a driver and a plurality of loads having respective initial locations on the IC, and further comprising:
computing a fanout factor between the driver and the plurality of loads;
computing a slack factor between the driver and one or more of the plurality of loads;
determining that the fanout factor and the slack factor satisfy respective thresholds;
in response, performing a clustering algorithm on the plurality of loads to assign each load to a particular cluster of a plurality of clusters; and
modifying the initial netlist to replicate the driver for one or more of the plurality of clusters.

18. The system of claim 17, wherein the threshold for the fanout factor is a user-specified threshold.

19. The system of claim 17, wherein determining that the fanout factor satisfies a threshold comprises:
determining that the plurality of loads are part of a same macro device;
obtaining a custom fanout threshold that is specific to the macro device; and
determining that the fanout factor satisfies the custom fanout threshold that is specific to the macro device.

20. A computer program product, encoded on one or more non-transitory computer storage media, comprising instructions that when executed by one or more computers cause the one or more computers to perform operations of one or more physical synthesis processes during an overall placement process for components on an integrated circuit (IC), the operations comprising:
receiving an initial netlist of a circuit design for the IC;
performing a global placement process that assigns to some components in the initial netlist a respective initial location on the IC;
performing one or more physical synthesis processes to generate a modified netlist before assigning a final location to all components in the circuit design by the overall placement process;
performing a subsequent placement process to assign a final location on the IC to all components in the modified netlist;
wherein the overall placement process comprises the global placement process and a detail placement process, and wherein generating the modified netlist comprises generating the modified netlist after the global placement process and before the detail placement process; and
wherein generating the modified netlist occurs after some components have been assigned an initial location by the global placement process and before an initial location is modified by the detail placement process.

* * * * *